United States Patent [19]

Eistert et al.

[11] 4,197,690

[45] Apr. 15, 1980

[54] POSITION DETECTOR FOR ROW-CROP HARVESTER

[75] Inventors: Theodor Eistert, Neustadt; Christian Noack, Guttau; Manfred Teichmann, Bischofswerda; Bernd Zumpe, Rathmannsdorf; Gerhard Schmidt, Kirschau; Lothar Näther, Wilschdorf, all of German Democratic Rep.

[73] Assignee: VEB Kombinat Fortschritt Landmaschinen, Neustadt in Sachsen, German Democratic Rep.

[21] Appl. No.: 892,920

[22] Filed: Apr. 3, 1978

[30] Foreign Application Priority Data

Apr. 4, 1977 [DD] German Democratic Rep. ... 198231

[51] Int. Cl.² ............................................. A01D 69/00
[52] U.S. Cl. .............................. 56/10.2; 56/DIG. 15; 180/131
[58] Field of Search .................... 56/10.2, DIG. 15; 180/131, 79; 104/244.1

[56] References Cited

U.S. PATENT DOCUMENTS

| 3,853,069 | 12/1974 | Goodwin | 180/79 |
| 3,857,455 | 12/1974 | Ernst | 56/10.2 |
| 4,057,019 | 11/1977 | Shaffer | 180/131 |

FOREIGN PATENT DOCUMENTS

| 2223074 | 2/1973 | Fed. Rep. of Germany | 180/131 |
| 2362899 | 6/1975 | Fed. Rep. of Germany | 56/10.2 |

Primary Examiner—Jay N. Eskovitz
Attorney, Agent, or Firm—Karl F. Ross

[57] ABSTRACT

An agricultural machine displaceable in a predetermined travel direction and having relative thereto a plurality of forwardly extending arms forming forwardly open throats for receiving respective rows of a crop during harvesting thereof has a position-detecting system comprising a feeler pivoted about an upright axis underneath each of the arms. Each feeler is an elastically flexible plate carried on a rigid arm connected to the respective pivot and each plate has a pair of lateral edges each exposed in front of a respective one of the throats flanking the respective plate. The feelers are all mechanically connected for joint pivoting by a common link that is connected to a signal generator in turn connected to the steering system of the agricultural machine.

10 Claims, 3 Drawing Figures

POSITION DETECTOR FOR ROW-CROP HARVESTER

FIELD OF THE INVENTION

The present invention relates to an agricultural machine. More particularly this invention concerns a position-detecting system for a row-crop harvesting machine.

BACKGROUND OF THE INVENTION

It is known to provide a row-crop harvesting machine, as for example a corn cutter, with a position-detecting system that is connected to the steering system of the agricultural machine so as automatically to guide this machine accurately along the rows of crop. The function of this position-detecting system is to ensure that each of the rows of crop passes directly into a respective throat of a respective cutter of the crop head of the machine. Normally such a machine has a plurality of forwardly extending arms that define a plurality of throats equispaced apart in a direction transverse to the normal transport direction of the machine along the ground.

One such position-detecting system is seen in German Patent Publication No. 2,434,396 which is based on a relatively complex computer that is connected to a pair of sensors each of which bears on a respective side of a single row of the crop entering the harvesting machine. Such a system is relatively expensive because it is necessary to provide a relatively complex minicomputer for reducing the readings of the feelers to usable information. Furthermore if the single row of crop being sensed is irregular or one of the two feelers fails, the entire system is down and must be repaired. This last-mentioned disadvantage can be overcome by providing a plurality of such row feelers; however, the overall cost of such a position-detecting system becomes prohibitive.

In this known system a blocking of the cutter throat of the harvesting machine at the position detector also will give a false reading. What is more, the feelers are normally set up so that if for some reason the agricultural machine in question must be backed up, a considerable danger of damaging the feelers by bending them over is present. Finally, this known system makes it very difficult to use the machine on anything but a perfectly regularly spaced row crop. Any variation in the row spacing requires extensive re-alignment and re-setting of the entire machine, even though the normal crop cutter is set up so that its throat can accept crops at a row spacing within the normal range without requiring re-adjustment of the machine.

OBJECTS OF THE INVENTION

It is therefore an object of the present invention to provide an improved position-detecting system for an agricultural machine.

Another object is the provision of such a position-detecting system which is relatively simple in construction, yet can be used to accurately steer the machine being controlled thereby along the rows of a crop which may be relatively irregular or of varying spacing.

SUMMARY OF THE INVENTION

These objects are attained according to the instant invention in a machine of the above-described general type wherein a plurality of elastically deformable feeler plates each have a maximum width measured transversely to the travel direction of the machine that is at most equal to the minimum transverse spacing between adjacent rows of the crop to be harvested. Each of these feeler plates is mounted at a respective pivot between adjacent throats with each of its lateral edges in front of one of these throats. Thus the rows of crop can engage these lateral edges and laterally deflect the feeler plates on entering the throats. All of these plates are interconnected mechanically by means of a link for joint pivoting and control means is connected to this link for ascertaining the extent of lateral deflection of the feeler plates.

The use of a plurality of such feeler plates allows the determination of an average valve, so that the agricultural machine in question can be guided in accordance with information derived from a plurality of rows of the crop. If a single plant is outside of its row, or a row has a gap, this irregularity will have little effect on the overall reading produced by the device. Furthermore such an arrangement is extremely simple and only requires a single control arrangement connected to the link and to the steering mechanism of the vehicle for its operation.

According to further features of this invention each of the feelers is pivoted about an upright axis tipped forward in the displacement direction of the machine at a location equidistant between the flanking cutter throats of the machine. Thus each of these feelers extends forwardly from its respective pivot and its lateral edges are exposed to either lateral side of the arm of the machine under which the feeler is mounted. Furthermore these feelers are of decreasing width in a direction transverse to the displacement direction, normally being widest toward the center of the machine and narrowest at the outside of the machine. Thus it is possible to use the system according to this invention with crops of different row spacing with absolutely no readjustment, as all of the feelers are linked together for joint pivoting so that when the crop spacing is relatively wide the inside edges alone will normally contact the crop, and vice versa when the spacing is relatively narrow.

Furthermore according to this invention these feelers each comprise an elastically flexible plate secured to a rigid stem that in turn is secured to the pivot. The plate is generally triangular with forwardly and inwardly inclined convex lateral edges. Such an arrangement ensures that damage to the feelers will be very unlikely, as the plates will be able to bend easily out of the way in case they are struck by a stray crop stem, and thereafter return to their working positions. It is possible in accordance with this invention to stiffen the edges only of these plates.

The above-mentioned stem may extend backwardly of each of the pivots and be connected via short rigid links to the above-mentioned common link for all of the feelers. This common link in turn is connected to the signal generator of the system which may be a simple Wheatstone bridge that produces an output whose resistance varies to one side or the other of a predetermined average resistance in accordance with deflection to one side or the other of the feelers. Springs may urge the feelers all into the central position to reinforce the effect of the forwardly tipped pivot axes for these feelers.

SPECIFIC DESCRIPTION

Figure 1:
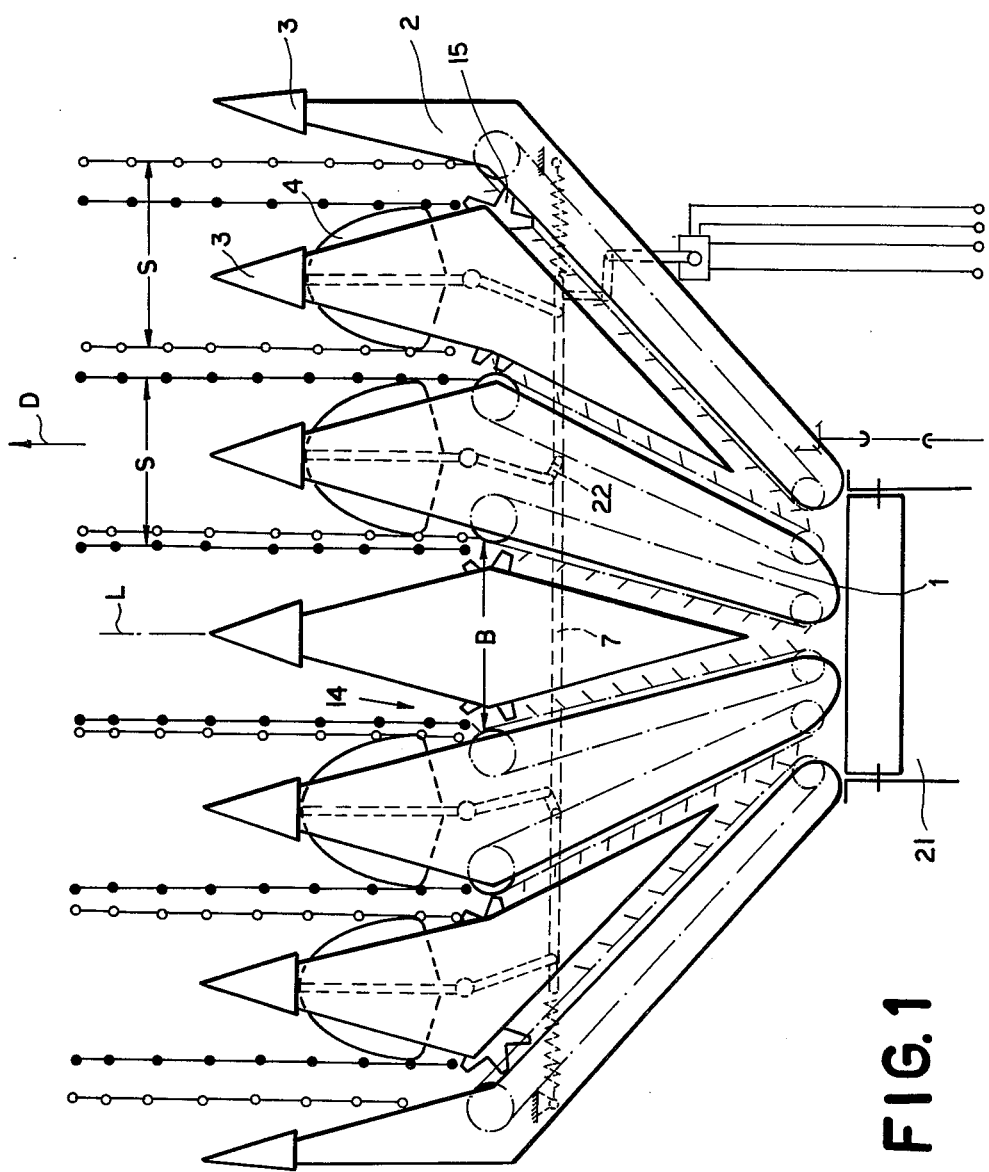
FIG. 1 is a top view of the arrangement according to this invention.
Figure 2:
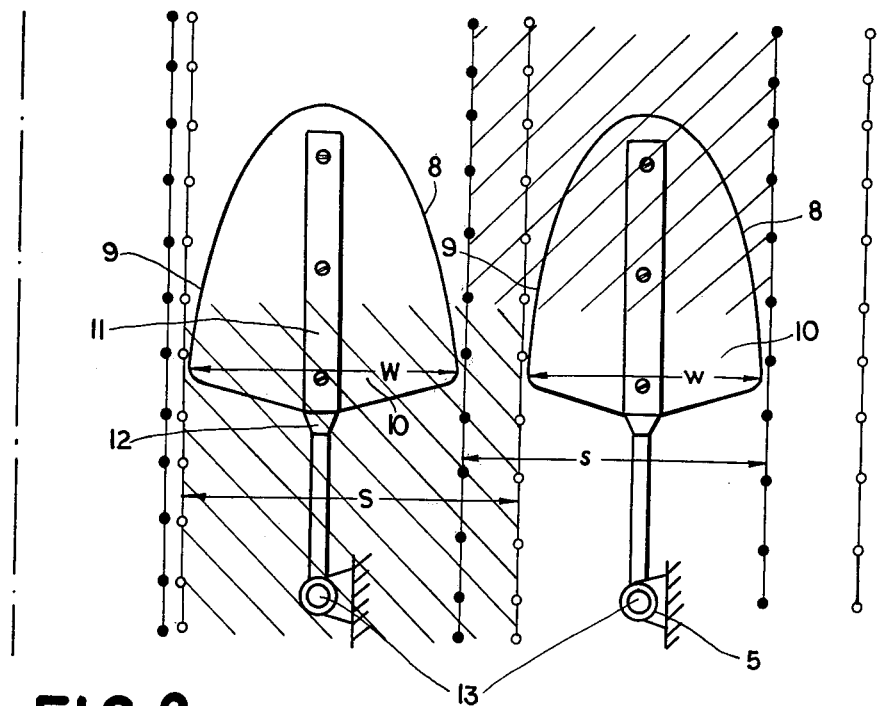
FIG. 2 is a large-scale view of a detail of the arrangement of FIG. 1.
Figure 3:
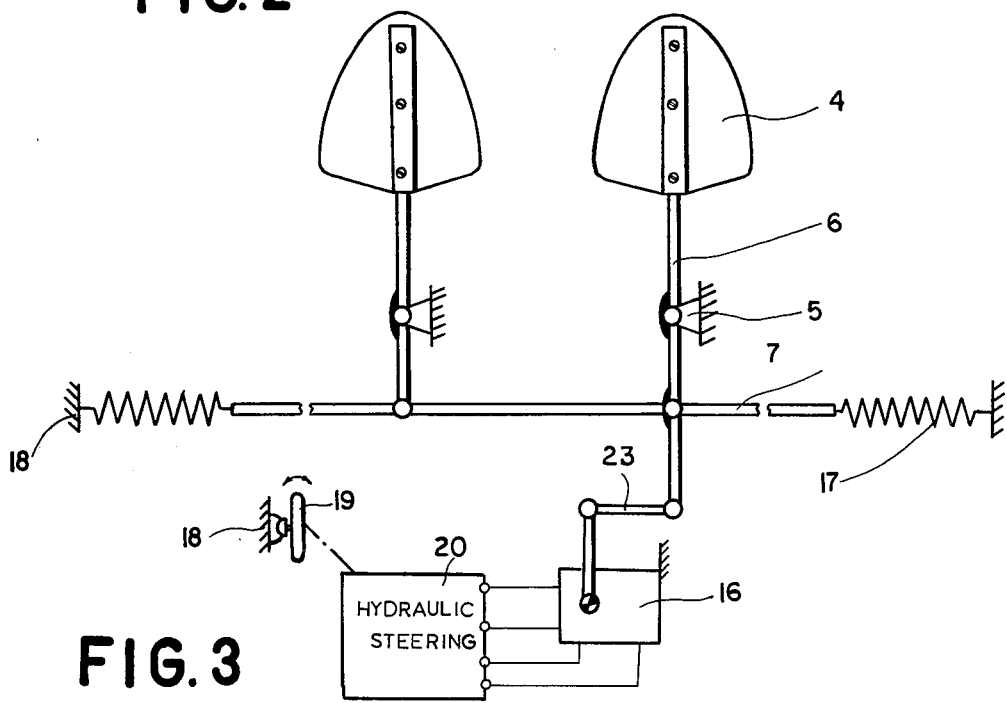
FIG. 3 is another detail view of the system in accordance with this invention.

As shown FIGS. 1–3 a corn head 1 of a self-powered agricultural harvesting machine 21 has a plurality of forwardly extending arms 2 each provided at its front end relative to the normal direction of travel D of the machine with a forwardly pointed shoe 3. These arms 2 define cutter throats 14 spaced apart by a transverse distance B which is equal to more than the minimum spacing s between adjacent crop rows and less than the maximum spacing S between adjacent crop rows, the former being shown as solid dots and the latter being shown as small circles in the drawing.

Underneath each of the arms 2 is a feeler 4 constituted as a flexible plate 10 of generally triangular shape and having a pair of forwardly and inwardly inclined edges 8 and 9 and a central stem 11 connected at 12 to a backwardly extending rigid arm 6.

The machine is provided under all of the central arms 2 with pivots 5 carried on the frame 18 of the machine and forming upright forwardly inclined pivot axes 13 equispaced between adjacent throats 14. Each of the arms 6 is pivoted at a respective one of the axes 13 and the rear end of each arm 6 on the other side of the axis 13 is connected to a transversely extending link 7 that is fixed either directly or via short intermediate links 22 to all of the arms 6, and which may be biased into a central position by means of tension springs 17 connected to the frame 18. This link 7 in turn is connected via a respective linkage 23 to a signal generator 16 formed as a Wheatstone bridge connected to the hydraulic steering arrangement 20 that operates the wheels 19 of the vehicle.

A cutter 15 is provided at each throat 14 for severing the crop that enters this throat 14, whence the crop is passed up to the harvesting machine.

With the system according to the instant invention the plates 10 have widths varying from a maximum width W substantially smaller than the row spacing s to a relatively small width w. The two feelers 4 closest to the centerline L of the machine as seen in FIG. 1 are of this relatively great width W and the outermost feelers are of the smaller width w. As apparent from FIGS. 1 and 2 when the crop is relatively widely spaced only the right-hand edges of the two left-hand feelers 4 will be effective, and only the two left-hand edges of the two right-hand feelers 4. On the other hand when the spacing is relatively narrow the opposite edges of these feelers come into play. Thus this arrangement does not require readjusting for crops of different spacings, so that a machine which is normally set up to harvest crops having spacings varying between S and s can be provided with the apparatus according to this invention so that variation of the crop spacing will not require readjustment of the machine.

As the machine moves along the rows of crop the stems of this crop will deflect the feeler plates 4 to one side or the other with the deflection to one side of the centerline L being in one direction and on the the other side being in the other direction when the machine is perfectly aligned, so that these two deflections will averaged out by the link 7. On the contrary when machine becomes misaligned with the rows of crop the average value determined by the link 7 will vary and will cause the signal generator 16 to operate the hydraulic steering mechanism 20 to turn the wheels 19 of the vehicle and steer it back into proper alignment with the crop rows.

It is of course within the scope of this invention to provide more than two such feelers to either side of the centerline L of the machine or a plurality or even only one to each side. In order to eliminate the necessity of readjusting the machine for different crop spacings it is merely necessary to provide the same number of feelers to each side of the machine centerline L.

We claim:

1. In an agricultural machine displaceable in a predetermined travel direction, having steering means, and having relative to said direction a plurality of forwardly extending arms forming forwardly open throats each adapted to receive a row of a row crop whose rows are transversely spaced apart by a distance lying between a predetermined maximum transverse spacing and a predetermined minimum transverse spacing, a position-detecting system comprising:

a plurality of feeler plates each having a pair of lateral edges and having a maximum width measured transverse to said direction between the respective edges at most equal to said minimum transverse spacing;

respective pivot means for mounting said plates on said arms of said machine with said edges exposed between said arms in the respective throats, each of said plates being transversely deflectable by engagement of crop against its said edges;

means including a link interconnecting all of said plates for joint codirectional pivoting; and control means connected between said link and said steering means for automatic course correction to a course with said plates generally equidistant between the respective rows in the respective throats.

2. The system defined in claim 1 wherein said feeler plates are flexible and elastically deformable by said crop.

3. The system defined in claim 2 wherein each of said pivot means defines an upright pivot axis for the respective feeler plate substantially equidistant between the respective throats.

4. The system defined in claim 3 wherein said axes are included forwardly in said direction of travel.

5. The system defined in claim 3, further comprising spring means for biasing said feeler plates into respective position equidistant between the respective flanking throats.

6. The system defined in claim 3 wherein said plates are arranged in a row extending transverse to said direction and are of decreasing transverse width from a location in said row.

7. The system defined in claim 6 wherein said location is at the center of said row and the same number of said plates is provided to each said of said center.

8. The system defined in claim 3 wherein said plates are elastically deformable and each provided with a relatively stiff stem connected to the respective pivot means.

9. The system defined in claim 8 wherein all of said stems are rigidly interconnected by said link.

10. The system defined in claim 7 wherein at least two such plates are provided to each side of said center.

* * * * *